United States Patent
Kohri

(10) Patent No.: US 9,306,397 B2
(45) Date of Patent: Apr. 5, 2016

(54) SYSTEM INCLUDING FIRST AND SECOND APPARATUSES SUPPLYING ELECTRIC POWER TO EACH OTHER

(71) Applicant: Yuusuke Kohri, Ikedashi (JP)

(72) Inventor: Yuusuke Kohri, Ikedashi (JP)

(73) Assignee: RICOH COMPANY, LTD., Tokyo (JP)

( * ) Notice: Subject to any disclaimer, the term of this patent is extended or adjusted under 35 U.S.C. 154(b) by 418 days.

(21) Appl. No.: 13/956,049

(22) Filed: Jul. 31, 2013

(65) Prior Publication Data

US 2014/0035367 A1 Feb. 6, 2014

(30) Foreign Application Priority Data

Jul. 31, 2012 (JP) .................. 2012-170453

(51) Int. Cl.
*H02J 1/10* (2006.01)
*H02J 4/00* (2006.01)
*G03G 15/00* (2006.01)

(52) U.S. Cl.
CPC .............. *H02J 4/00* (2013.01); *G03G 15/5004* (2013.01); *H02J 1/102* (2013.01); *Y10T 307/391* (2015.04)

(58) Field of Classification Search
CPC ........ H02J 4/00; H02J 1/102; G03G 15/5004; Y10T 307/391
USPC ............................................................ 307/29
See application file for complete search history.

(56) References Cited

U.S. PATENT DOCUMENTS

2013/0063130 A1    3/2013   Kohri

*Primary Examiner* — Hal Kaplan
(74) *Attorney, Agent, or Firm* — Oblon, McClelland, Maier & Neustadt, L.L.P.

(57) ABSTRACT

A system including: first and second apparatuses that supply electric power to each other; the first and second apparatuses including first and second converters configured to convert externally supplied power to first and second direct current powers; a predicted value calculator configured to calculate first, second, and third predicted values of needed electric power in first, second, and third power source conditions based on a first conversion efficiency of the first converter and a second conversion efficiency of the second converter; and a controller configured to switch an electric power condition corresponding to a smallest predicted value of the first, second, and third predicted values.

18 Claims, 11 Drawing Sheets

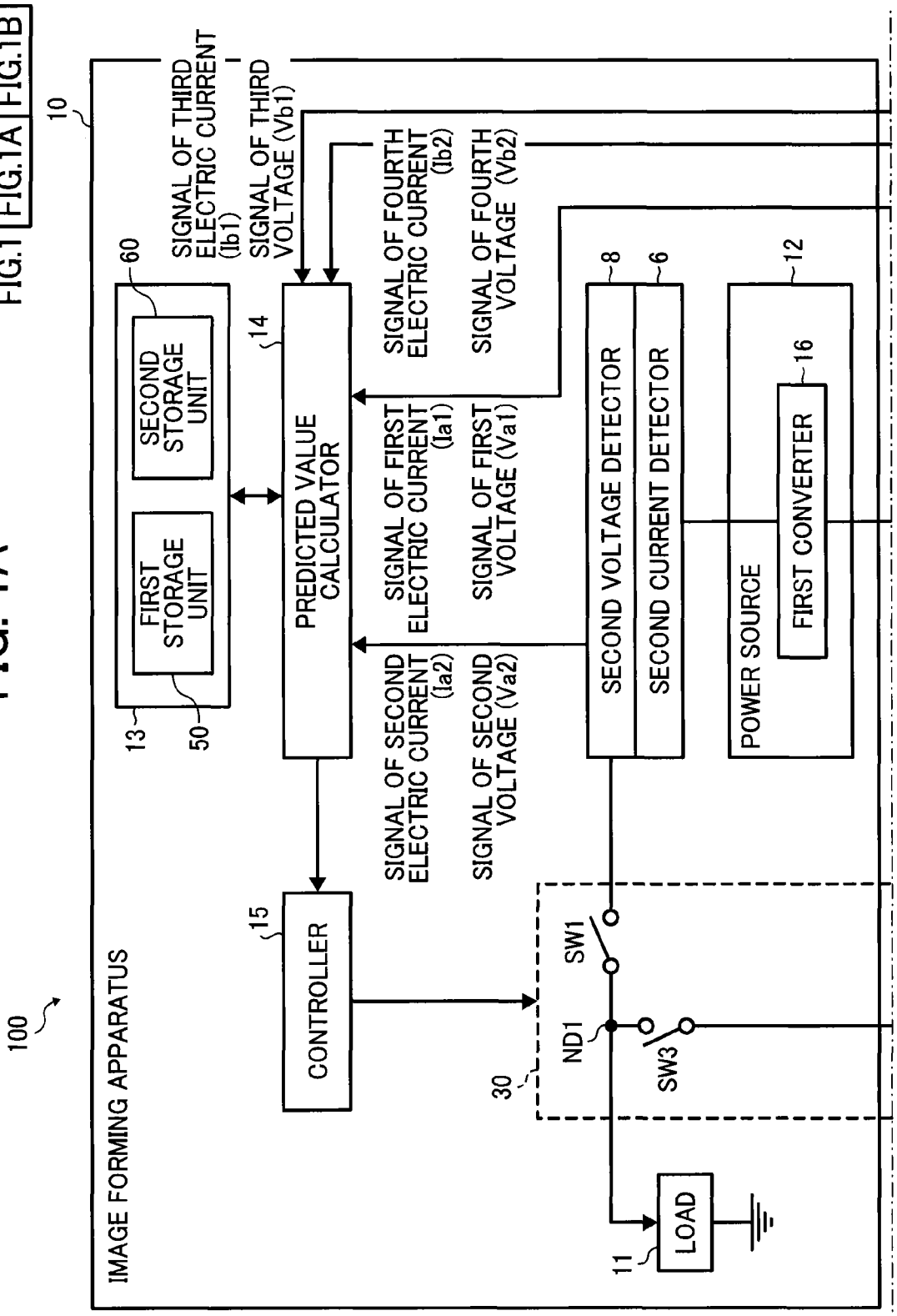

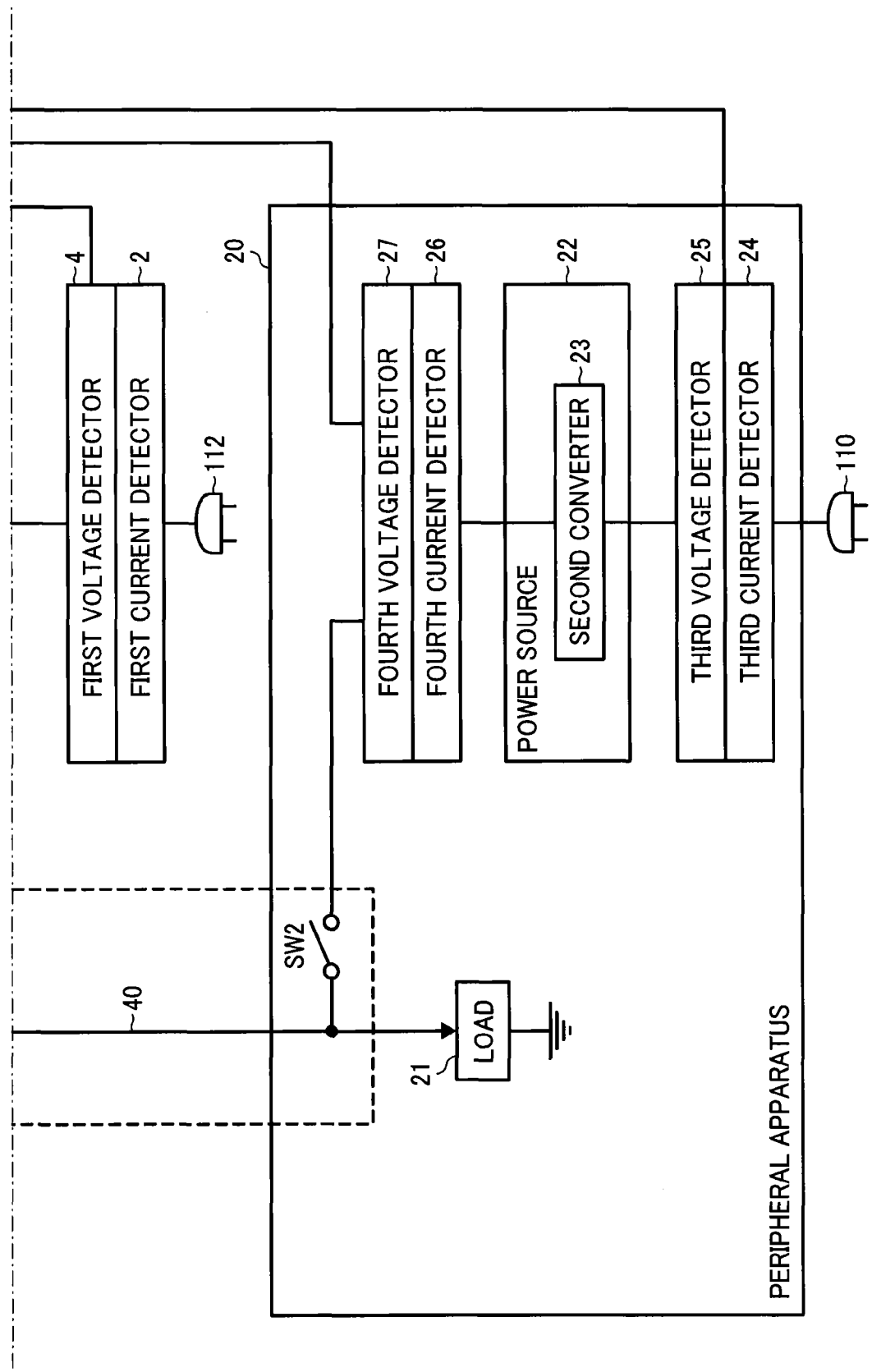

FIG. 2

| SWITCH | FIRST POWER SOURCE CONDITION | SECOND POWER SOURCE CONDITION | THIRD POWER SOURCE CONDITION |
|---|---|---|---|
| SW1 | ON | OFF | ON |
| SW2 | OFF | ON | ON |
| SW3 | ON | ON | OFF |

FIG. 4

| | | \multicolumn{10}{c}{SECOND ELECTRIC CURRENT Ia2} |
|---|---|---|---|---|---|---|---|---|---|---|---|
| | | 0.5A | 1.0A | 1.5A | 2.0A | 2.5A | 3.0A | 3.5A | 4.0A | 4.5A | 5.0A |
| FIRST VOLTAGE Va1 | 98.5V | 1.19 | 1.18 | 1.17 | 1.16 | 1.16 | 1.16 | 1.16 | 1.16 | 1.16 | 1.16 |
| | 99.0V | 1.19 | 1.18 | 1.17 | 1.15 | 1.15 | 1.15 | 1.15 | 1.15 | 1.15 | 1.15 |
| | 99.5V | 1.19 | 1.18 | 1.16 | 1.15 | 1.14 | 1.14 | 1.14 | 1.14 | 1.14 | 1.14 |
| | 100.0V | 1.18 | 1.18 | 1.16 | 1.15 | 1.14 | 1.13 | 1.13 | 1.13 | 1.13 | 1.13 |
| | 100.5V | 1.18 | 1.17 | 1.16 | 1.15 | 1.14 | 1.12 | 1.12 | 1.12 | 1.12 | 1.13 |
| | 101.0V | 1.18 | 1.17 | 1.16 | 1.15 | 1.14 | 1.12 | 1.11 | 1.11 | 1.11 | 1.12 |
| | 101.5V | 1.18 | 1.17 | 1.16 | 1.15 | 1.14 | 1.12 | 1.11 | 1.10 | 1.11 | 1.12 |
| | 102.0V | 1.18 | 1.17 | 1.16 | 1.15 | 1.14 | 1.13 | 1.11 | 1.11 | 1.11 | 1.13 |
| | 102.5V | 1.18 | 1.17 | 1.16 | 1.15 | 1.15 | 1.13 | 1.13 | 1.12 | 1.12 | 1.14 |
| | 103.0V | 1.18 | 1.17 | 1.16 | 1.15 | 1.15 | 1.14 | 1.14 | 1.13 | 1.14 | 1.15 |

FIG. 5

| | | \multicolumn{10}{c}{FOURTH ELECTRIC CURRENT Ib2} |
|---|---|---|---|---|---|---|---|---|---|---|---|
| | | 0.5A | 1.0A | 1.5A | 2.0A | 2.5A | 3.0A | 3.5A | 4.0A | 4.5A | 5.0A |
| THIRD VOLTAGE Vb1 | 98.5V | 1.26 | 1.25 | 1.24 | 1.23 | 1.23 | 1.23 | 1.23 | 1.23 | 1.23 | 1.23 |
| | 99.0V | 1.26 | 1.25 | 1.24 | 1.22 | 1.22 | 1.22 | 1.22 | 1.22 | 1.22 | 1.22 |
| | 99.5V | 1.26 | 1.25 | 1.23 | 1.22 | 1.21 | 1.21 | 1.21 | 1.21 | 1.21 | 1.21 |
| | 100.0V | 1.25 | 1.25 | 1.23 | 1.22 | 1.21 | 1.20 | 1.20 | 1.20 | 1.20 | 1.20 |
| | 100.5V | 1.25 | 1.24 | 1.23 | 1.22 | 1.21 | 1.19 | 1.19 | 1.19 | 1.19 | 1.20 |
| | 101.0V | 1.25 | 1.24 | 1.23 | 1.22 | 1.21 | 1.19 | 1.18 | 1.18 | 1.18 | 1.19 |
| | 101.5V | 1.25 | 1.24 | 1.23 | 1.22 | 1.21 | 1.19 | 1.18 | 1.17 | 1.18 | 1.19 |
| | 102.0V | 1.25 | 1.24 | 1.23 | 1.22 | 1.21 | 1.20 | 1.18 | 1.18 | 1.18 | 1.20 |
| | 102.5V | 1.25 | 1.24 | 1.23 | 1.22 | 1.22 | 1.20 | 1.20 | 1.19 | 1.19 | 1.21 |
| | 103.0V | 1.25 | 1.24 | 1.23 | 1.22 | 1.22 | 1.21 | 1.21 | 1.20 | 1.21 | 1.22 |

FIG. 6

| RATIO OF CURRENT SOURCES | STANDBY | SIMPLEX PRINTING ON ONE SHEET | SIMPLEX PRINTING ON PLURAL SHEETS | DUPLEX PRINTING ON ONE SHEET | DUPLEX PRINTING ON PLURAL SHEETS | DUPLEX PRINTING + STAPLING | DUPLEX PRINTING + PUNCHING | DUPLEX PRINTING + STAPLING + PUNCHING |
|---|---|---|---|---|---|---|---|---|
| RATIO OF Ia2 [%] | 100% | 100% | 100% | 100% | 100% | 60% | 60% | 50% |
| RATIO OF Ib2 [%] | 0% | 0% | 0% | 0% | 0% | 40% | 40% | 50% |

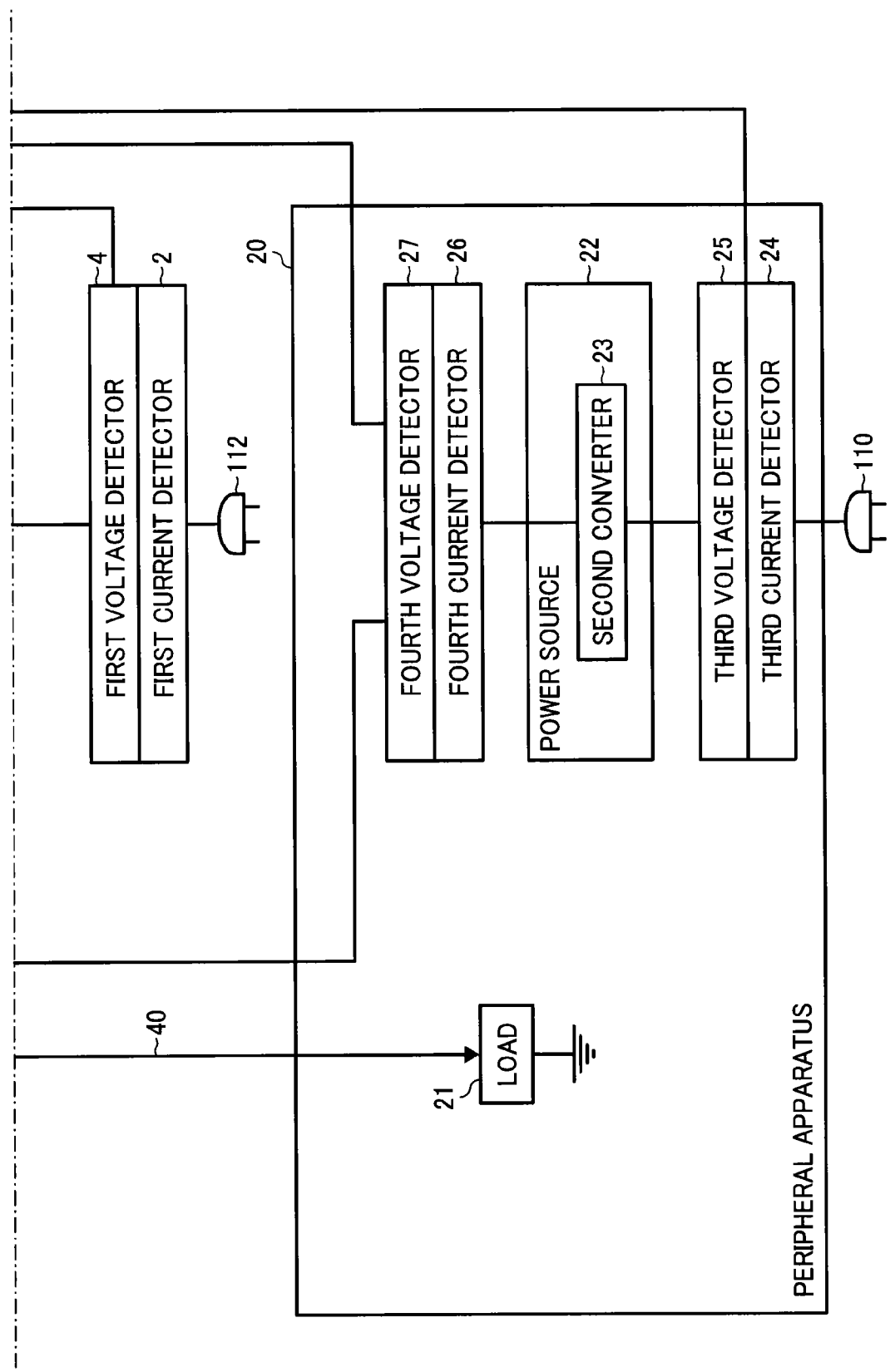

FIG. 9

DATA IN THE FIRST STORAGE UNIT 50

| FIRST VOLTAGE Va1 | SECOND ELECTRIC CURRENT Ia2 | | | | | | | | | |
|---|---|---|---|---|---|---|---|---|---|---|
| | 0.5A | 1.0A | 1.5A | 2.0A | 2.5A | 3.0A | 3.5A | 4.0A | 4.5A | 5.0A |
| 98.5V | 1.19 | 1.18 | 1.17 | 1.16 | 1.16 | 1.16 | 1.16 | 1.16 | 1.16 | 1.16 |
| 99.0V | 1.19 | 1.18 | 1.17 | 1.15 | 1.15 | 1.15 | 1.15 | 1.15 | 1.15 | 1.15 |
| 99.5V | 1.19 | 1.18 | 1.16 | 1.15 | 1.14 | 1.14 | 1.14 | 1.14 | 1.14 | 1.14 |
| 100.0V | 1.18 | 1.18 | 1.16 | 1.15 | 1.14 | 1.13 | 1.13 | 1.13 | 1.13 | 1.13 |
| 100.5V | 1.18 | 1.17 | 1.16 | 1.15 | 1.14 | 1.12 | 1.12 | 1.12 | 1.12 | 1.13 |
| 101.0V | 1.18 | 1.17 | 1.16 | 1.15 | 1.14 | 1.12 | 1.11 | 1.11 | 1.11 | 1.12 |
| 101.5V | 1.18 | 1.17 | 1.16 | 1.15 | 1.14 | 1.12 | 1.11 | 1.10 | 1.11 | 1.12 |
| 102.0V | 1.18 | 1.17 | 1.16 | 1.15 | 1.14 | 1.13 | 1.11 | 1.11 | 1.11 | 1.13 |
| 102.5V | 1.18 | 1.17 | 1.16 | 1.15 | 1.15 | 1.13 | 1.13 | 1.12 | 1.12 | 1.14 |
| 103.0V | 1.18 | 1.17 | 1.16 | 1.15 | 1.15 | 1.14 | 1.14 | 1.13 | 1.14 | 1.15 |

Ia2+Ib2=0.5A+3.0A=3.5
Ia2+Ib2=1.0A+2.5A=3.5
Ia2+Ib2=1.5A+2.0A=3.5
Ia2+Ib2=3.0A+0.5A=3.5
Ia2+Ib2=2.5A+1.0A=3.5
Ia2+Ib2=2.0A+1.5A=3.5

THE CONTROLLER SEARCHES COMBINATIONS OF SATISFYING NEEDED ELECTRIC CURRENT, AND CALCULATES POWER BASED ON CONVERSION EFFICIENCY CORRESPONDING TO THE COMBINATION. THE CONTROLLER SEARCH THE COMBINATION THAT THE POWER IS SMALLEST.

| THIRD VOLTAGE Vb1 | FOURTH ELECTRIC CURRENT Ib2 | | | | | | | | | |
|---|---|---|---|---|---|---|---|---|---|---|
| | 0.5A | 1.0A | 1.5A | 2.0A | 2.5A | 3.0A | 3.5A | 4.0A | 4.5A | 5.0A |
| 98.5V | 1.26 | 1.25 | 1.24 | 1.23 | 1.23 | 1.23 | 1.23 | 1.23 | 1.23 | 1.23 |
| 99.0V | 1.26 | 1.25 | 1.24 | 1.23 | 1.22 | 1.22 | 1.22 | 1.22 | 1.22 | 1.22 |
| 99.5V | 1.26 | 1.25 | 1.23 | 1.22 | 1.21 | 1.21 | 1.21 | 1.21 | 1.21 | 1.21 |
| 100.0V | 1.25 | 1.25 | 1.23 | 1.22 | 1.21 | 1.20 | 1.20 | 1.20 | 1.20 | 1.20 |
| 100.5V | 1.25 | 1.24 | 1.23 | 1.22 | 1.21 | 1.19 | 1.19 | 1.19 | 1.19 | 1.20 |
| 101.0V | 1.25 | 1.24 | 1.23 | 1.22 | 1.21 | 1.19 | 1.18 | 1.18 | 1.18 | 1.19 |
| 101.5V | 1.25 | 1.24 | 1.23 | 1.22 | 1.21 | 1.19 | 1.18 | 1.17 | 1.18 | 1.19 |
| 102.0V | 1.25 | 1.24 | 1.23 | 1.22 | 1.21 | 1.20 | 1.18 | 1.18 | 1.18 | 1.20 |
| 102.5V | 1.25 | 1.24 | 1.23 | 1.22 | 1.22 | 1.20 | 1.20 | 1.19 | 1.19 | 1.21 |
| 103.0V | 1.25 | 1.24 | 1.23 | 1.22 | 1.22 | 1.21 | 1.21 | 1.20 | 1.21 | 1.22 |

DATA IN THE SECOND STORAGE UNIT 60

SYSTEM INCLUDING FIRST AND SECOND APPARATUSES SUPPLYING ELECTRIC POWER TO EACH OTHER

CROSS-REFERENCE TO RELATED APPLICATIONS

The present application claims priority to JP 2012-170453 filed Jul. 31, 2012, the entire contents of which are incorporated herein by reference.

BACKGROUND OF THE INVENTION

1. Field of the Invention

Embodiments of the present invention relate to a system, and an electronic device.

2. Description of the Background Art

A large size apparatus often needs a great amount of electric power. Thereby, the large size apparatus may perform operations using not only electric power supplied internally, but also electric power supplied from a peripheral external apparatus.

JP-A No. 2008-258961 discloses selecting utilized power sources corresponding to needed total electric power at an image forming apparatus and needed electric power at a peripheral apparatus. Specifically, the above described document discloses selecting utilized power sources by using a power source of the image forming apparatus, using a power source of the peripheral apparatus, or using both the power source of the image forming apparatus and the power source of the peripheral apparatus.

In the technology disclosed in the above-described document, when the power source of the image forming apparatus and the power source of the peripheral apparatus have different electric efficiencies, the image forming system cannot operate as a high efficiency system.

SUMMARY OF THE INVENTION

The embodiments of the present invention have been developed in view of the above-described problems of the background techniques.

An objective of the embodiments of the present invention is to provide a system and an electronic apparatus that can perform with high electric efficiency.

In one aspect, a system includes a first apparatus and a second apparatus which supply electric power to each other; and the first apparatus including a first converter configured to convert externally supplied power to a first direct current power; the second apparatus including a second converter configured to convert externally supplied power to a second direct current power; the system further including: a predicted value calculator configured to calculate, based on a first conversion efficiency of the first converter and a second conversion efficiency of the second converter, (a) a first predicted value of needed electric power in a first power source condition, which is a condition that the first direct current power is supplied to a load of the first apparatus and a load of the second apparatus and a second direct current power is not supplied to the load of the first apparatus and the load of the second apparatus, (b) a second predicted value of the needed electric power in a second power source condition, which is a condition that the second direct current power is supplied to the load of the first apparatus and the load of the second apparatus and the first direct current power is not supplied to the load of the first apparatus and the load of the second apparatus, and (c) a third predicted value of the needed electric power in a third power source condition, which is a condition that the first direct current power and the second direct current power are supplied to a load of the first apparatus and a load of the second apparatus; and a controller configured to switch an electric power condition corresponding to the smallest predicted value of the first predicted value, the second predicted value, and the third predicted value.

In another aspect, an electronic device supplies electric power to a peripheral apparatus and receives electric power from the peripheral apparatus, the peripheral apparatus including a second converter configured to convert externally supplied power to the second direct current power; the device including: a first converter configured to convert externally supplied power to a first direct current power; a predicted value calculator configured to calculate, based on a first conversion efficiency of the first converter and a second conversion efficiency of the second converter, (a) a first predicted value of the needed electric power in a first power source condition, which is a condition that the first direct current power is supplied to a load of the first apparatus and a load of the second apparatus and the second direct current power is not supplied to the load of the first apparatus and the load of the second apparatus, (b) a second predicted value of the needed electric power in a second power source condition, which is a condition that the second direct current power is supplied to the load of the first apparatus and the load of the second apparatus and the first direct current power is not supplied to the load of the first apparatus and the load of the second apparatus, and (c) a third predicted value of the needed electric power in a third power source condition, which is a condition that the first direct current power and the second direct current power is supplied to a load of the first apparatus and a load of the second apparatus; and a controller configured to switch an electric power condition corresponding to the smallest predicted value of the first predicted value, the second predicted value, and the third predicted value.

In another aspect, an electronic device includes: a first converter configured to convert externally supplied power to a first direct current power; a second converter configured to convert externally supplied power to a second direct current power; a predicted value calculator configured to calculate, based on a first conversion efficiency of the first converter and a second conversion efficiency of the second converter, (a) a first predicted value of needed electric power in a first power source condition, which is a condition that the first direct current power is supplied to a load of the first apparatus and a load of the second apparatus and the second direct current power is not supplied to the load of the first apparatus and the load of the second apparatus, (b) a second predicted value of needed electric power in a second power source condition, which is a condition that the second direct current power is supplied to the load of the first apparatus and the load of the second apparatus and the first direct current power is not supplied to the load of the first apparatus and the load of the second apparatus, and (c) a third predicted value of needed electric power in a third power source condition, which is a condition that the first direct current power and the second direct current power is supplied to a load of the first apparatus and a load of the second apparatus; and a controller configured to switch an electric power condition corresponding to the smallest predicted value of the first predicted value, the second predicted value, and the third predicted value.

According to the embodiments of the present invention, the system and the electronic apparatus perform with high electric efficiency.

BRIEF DESCRIPTION OF THE DRAWINGS

A more complete appreciation of the embodiments and many of the attendant advantages will be readily obtained as the same becomes better understood by reference to the following detailed description when considered in connection with the accompanying drawings, wherein:

FIGS. 1A and 1B are schematic configuration views showing an example of an image forming system according to a first embodiment of the present invention;

FIG. 2 is an illustration showing an example of a relationship between conditions of power sources and states of a first switch, a second switch, and a third switch according to the first embodiment of the present invention;

FIG. 4 is an illustration showing an example of data stored in a first storage unit according to an embodiment of the present invention;

FIG. 5 is an illustration showing an example of data stored in a second storing unit according to an embodiment of the present invention;

FIG. 6 is an illustration showing an example of a table of ratio of current sources according to an embodiment of the present invention;

FIGS. 7A and 7B are schematic configuration views showing an example of an image forming system according to a second embodiment of the present invention;

FIG. 9 is an illustration showing an example of a method of selecting best conditions of the ratio of current sources when joining a first direct current power and a second direct current power according to an embodiment of the present invention;

DETAILED DESCRIPTION OF PREFERRED EMBODIMENTS

Figure 3:
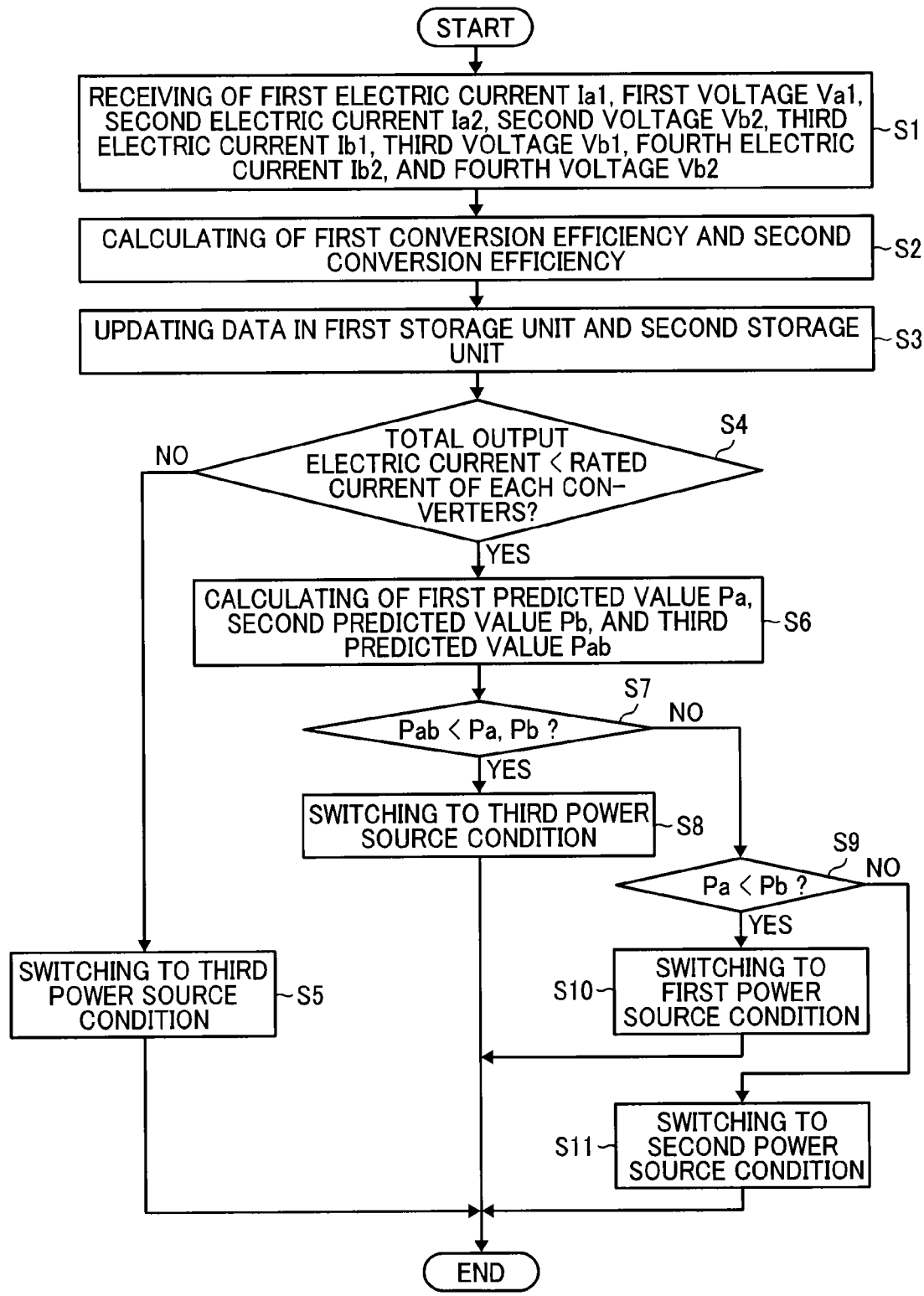
FIG. 3 is a flowchart showing an exemplary operation by the image forming system according to the first embodiment of the present invention.

Referring now to the drawings, like reference numerals designate identical or corresponding parts throughout the several views.

Hereinafter, an embodiment of the present invention will be explained by describing an exemplary system and electronic apparatus. In the following embodiments, an image forming apparatus is described as an example of the electronic apparatus, and an image forming system that includes an image forming apparatus and a peripheral apparatus is described as an example of the system. The system and the electronic apparatus are not limited to the exemplary image forming apparatus and image forming system. This invention can be also applied to any system and electronic apparatus that includes plural power sources.

FIGS. 1A and 1B are schematic configuration views showing an example of an image forming system 100 according to a first embodiment. As shown in FIGS. 1A, 1B, the image forming system 100 includes an image forming apparatus 10 and a peripheral apparatus 20. The image forming apparatus 10 and the peripheral apparatus 20 can supply electric power to each other. In this embodiment, the image forming apparatus 10 corresponds to a first apparatus, and the peripheral apparatus 20 corresponds to a second apparatus. Additionally, the image forming system 100 can include plural peripheral apparatuses 20.

The peripheral apparatus 20 includes a load 21 and a power source 22. The load 21 can be a stapler, a puncher, a folder, or the like. The power source 22 generates electric power that can be supplied to the load 21 or another load of the image forming apparatus 10. The power source 22 includes a second converter 23. The second converter 23 converts supplied power, which is externally supplied, to a second direct current power that can be supplied to the load 21 or another load of the image forming apparatus 10. The supplied power can be AC power or DC power. In an example shown in FIGS. 1A, 1B, the second converter 23 converts AC power supplied from a commercial power supply 110 to the second direct current power.

As shown in FIGS. 1A, 1B, the peripheral apparatus 20 includes a third current detector 24, a third voltage detector 25, a fourth current detector 26, and a fourth voltage detector 27. The third current detector 24 detects a third electric current Ib1 that is electric current of an input side (primary side) of the second converter 23. The third current detector 24 outputs a signal based on the third electric current Ib1 to the image forming apparatus 10. The third voltage detector 25 detects a third voltage Vb1 that is voltage of the input side (primary side) of the second converter 23. The third voltage detector 25 outputs a signal based on the third voltage Vb1 to the image forming apparatus 10. The fourth current detector 26 detects fourth electric current Ib2 that is electric current of an output side (secondary side) of the second converter 23. The fourth current detector 26 outputs a signal based on the fourth electric current Ib2 to the image forming apparatus 10. The fourth voltage detector 27 detects fourth voltage Vb2 that is voltage of the output side (secondary side) of the second converter 23. The fourth voltage detector 27 outputs a signal based on the fourth voltage Vb2 to the image forming apparatus 10.

As shown in FIGS. 1A, 1B, the image forming apparatus 10 includes a load 11, a power source 12, a storing unit 13, a predicted value calculator 14, and a controller 15. The load 11 can, for example, be an image forming unit that forms an image on a sheet or a fixing unit that fixes the image to the sheet. The power source 12 generates electric power that can be supplied to the load 11 or the load 21 of the peripheral apparatus 20. The power source 12 includes a first converter 16. The first converter 16 converts externally supplied power to first direct current power, which can be supplied to the load 11 or the load 21 of the peripheral apparatus 20. The supplied power can be AC power or DC power. In an example as shown in FIG. 1, the second converter 16 converts the AC power supplied from a commercial power supply 112 to the first direct current power.

As shown in FIGS. 1A, 1B, the image forming apparatus 10 includes a first current detector 2, a first voltage detector 4, a second current detector 6, and a second voltage detector 8. The first current detector 2 detects first electric current Ia1 that is electric current of an input side (primary side) of the first converter 16. The first current detector 2 outputs a signal based on the first electric current Ia1 to the predicted value calculator 14. The first voltage detector 4 detects first voltage Va1 that is voltage of the input side (primary side) of the first converter 16. The third voltage detector 4 outputs a signal based on the first voltage Va1 to the predicted value calculator 14. The second current detector 6 detects second electric current Ia2 that is electric current of an output side (secondary side) of the first converter 16. The second current detector 6 outputs a signal based on the second electric current Ia2 to the predicted value calculator 14. The second voltage detector 8 detects second voltage Va2 that is voltage of the output side (secondary side) of the first converter 16. The second voltage detector 8 outputs a signal based on the second voltage Va2 to the predicted value calculator 14.

The image forming system 100 includes a switching unit 30 that switches an electric power source condition to a first power source condition, a second power source condition, and a third power source condition. In the first power source condition, the first direct current power is supplied to the load 11 of the image forming apparatus 10 and the load 21 of the peripheral apparatus 20, and the second direct current power is not supplied to the load 11 of the image forming apparatus 10 and the load 21 of the peripheral apparatus 20. In the second power source condition, the second direct current power is supplied to the load 11 of the image forming apparatus 10 and the load 21 of the peripheral apparatus 20, and the first direct current power is not supplied to the load 11 of the image forming apparatus 10 and the load 21 of the peripheral apparatus 20. In the third power source condition, the first direct current power and the second direct current power are supplied to the load 11 of the image forming apparatus 10 and the load 21 of the peripheral apparatus 20.

In this embodiment, the third power source condition is described as an exemplary condition in which the first direct power is supplied to the load 11 of the image forming apparatus 10, and the second direct power is supplied to the load 21 of the peripheral apparatus 20, but the third power source condition is not limited to this exemplary condition. In this embodiment, the first direct current power converted by the first converter 16 and the second direct current power converted by the second converter 23 are input to the switching unit 30.

As shown in FIGS. 1A, 1B, the switching unit 30 of this embodiment includes a first switch SW1, a second switch SW2, and a third switch SW3. The image forming apparatus 10 is connected to the peripheral apparatus via power line 40. The first switch SW1 is arranged on the current path from the first converter (power source 12) to the load 11 of the image forming apparatus 10. A node ND1 is arranged on the current path from the first switch SW1 to the load 11 of the image forming apparatus 10. The node ND1 can be connected to a terminal of the power line 40 via the third switch SW3. The other terminal of the power line 40 is connected to the load 21 of the peripheral apparatus 20. The second switch SW2 is arranged on the current path from the second converter 23 (the power source 22) to the power line 40. The controller 15 controls on/off-states of each of the first switch SW1, the second switch SW2, and the third switch SW3.

FIG. 2 is an illustration showing a relationship between conditions of power sources and states of the first switch SW1, the second switch SW2, and the third switch SW3. In the first power source condition, the first switch SW1 and the third switch SW3 are on-state, the second switch SW2 is off-state. In the second power source condition, the first switch SW1 is off-state, and the second switch SW2 and the third switch SW3 are on-state. In the third power source condition, the first switch SW1 and the second switch SW2 are on-state, and the third switch SW2 is off-state.

As shown in FIGS. 1A, 1B, the storage unit 13 stores various information. In this embodiment, the storage unit 13 includes the first storage unit 50 and the second storage unit 60. The first storage unit 50 stores the first voltage Va1, the second electric current Ia2, and a first conversion efficiency 1/η1, which is conversion efficiency of the first converter 16 thereof correspondingly. The first conversion efficiency 1/η1, the first electric current Ia1, the first voltage Va1, the second electric current Ia2, and the second voltage Va2 satisfy following equation (Eq. 1).

$$Ia1*Va1 = 1/\eta1*(Ia2*Va2) \qquad (Eq.\ 1)$$

The second storage unit 60 stores the third voltage Vb1, the fourth electric current Ib2, and a second conversion efficiency 1/η2, which is conversion efficiency of the second converter 23 thereof correspondingly. The second conversion efficiency 1/η2, the third electric current Ib1, the third voltage Vb1, the fourth electric current Ib2, and the fourth voltage Vb2 satisfy a following equation (Eq. 2).

$$Ib1*Vb1 = 1/\eta2*(Ib2*Vb2) \qquad (Eq.\ 2)$$

The predicted value calculator 14 calculates a first predicted value Pa, which is a predicted value of the needed electric power in the first power source condition, a second predicted value Pb, which is a predicted value of the needed electric power in the second power source condition, and a third predicted value Pab, which is a predicted value of the needed electric power in the third power source condition, based on the first conversion efficiency 1/η1 and the second first conversion efficiency 1/η2.

Specifically, the predicted value calculator 14 calculates the first conversion efficiency 1/η1 based on the first electric current Ia1 detected by the first current detector 2, the first voltage Va1 detected by the first voltage detector 4, the second electric current Ia2 detected by the second current detector 6, and the second voltage Va2 detected by the second voltage detector 8.

The predicted value calculator 14 calculates the second conversion efficiency 1/η2 based on the third electric current Ib1 detected by the third current detector 24, the third voltage Vb1 detected by the third voltage detector 25, the fourth electric current Ib2 detected by the fourth current detector 26, and the fourth voltage Vb2 detected by the fourth voltage detector 27.

The predicted value calculator 14 calculates the first predicted value Pa, the second predicted value Pb, and the third predicted value Pab based on the first conversion efficiency 1/η1, the second conversion efficiency 1/η2, the first electric current Ia1, the first voltage Va1, the second electric current Ia2, the second voltage Va2, the third electric current Ib1, the third voltage Vb1, the fourth electric current Ib2, and the fourth voltage Vb2.

The controller 15 switches the switching unit 30 to the electric power condition corresponding to the smallest predicted value of the first predicted value Pa, the second predicted value Pb, and the third predicted value Pab, which are calculated by the predicted value calculator 14. For example, when the smallest predicted value is the first predicted value Pa, the controller 15 switches the switching unit 30 to the first electric condition. Specifically, the controller 15 controls the first switch SW1 into on-state, the third switch SW3 into on-state, and the second switch SW2 into off-state. When the smallest predicted value is the second predicted value Pb, the controller 15 switches the switching unit 30 to the second electric condition. Specifically, the controller 15 controls the second switch SW2 into on-state, the third switch SW3 into on-state, and the first switch SW1 into off-state. When the smallest predicted value is the third predicted value Pab, the controller 15 switches the switching unit 30 to the third electric condition. Specifically, the controller 15 controls the first switch SW1 into on-state, the second switch SW2 into on-state, and the third switch SW3 into off-state.

Next, a description will be given of the operation of the image forming system 100. FIG. 3 is a flowchart showing an exemplary operation by the image forming system 100. In this embodiment, the electric power condition at a starting time of the image forming system 100 is the third power source condition.

As shown in FIG. 3, the predicted value calculator 14 receives the first electric current Ia1 detected by the first current detector 2, the first voltage Va1 detected by the first voltage detector 4, the second electric current Ia2 detected by the second current detector 6, the second voltage Va2 detected by the second voltage detector 8, the third electric current Ib1 detected by the third current detector 24, the third voltage Vb1 detected by the third voltage detector 25, the fourth electric current Ib2 detected by the fourth current detector 26, and the fourth voltage Vb2 detected by the fourth voltage detector 27 (in step S1).

The predicted value calculator 14 then calculates the first conversion efficiency 1/η1 and the second conversion efficiency 1/η2 based on the first electric current Ia1, the first voltage Va1, the second electric current Ia2, the second voltage Va2, the third electric current Ib1, the third voltage Vb1, the fourth electric current Ib2, and the fourth voltage Vb2 received in step S1 (in step S2). Specifically, the predicted value calculator 14 calculates the first conversion efficiency 1/η1 by substituting the first electric current Ia1, the first voltage Va1, the second electric current Ia2, and the second voltage Va2 received in the step S1 into the Eq. 1. The predicted value calculator 14 calculates the second conversion efficiency 1/η2 by substituting the third electric current Ib1, the third voltage Vb1, the fourth electric current Ib2, and the fourth voltage Vb2 received in the step S1 into the Eq. 2.

The predicted value calculator 14 then updates the data stored in the first storage unit 50 with the first conversion efficiency 1/η1 calculated in the step S2, and updates the data stored in the second storing unit 60 with the second conversion efficiency 1/η2 calculated in the step S2 (in step S3). For example, the predicted value calculator 14 can update a value of the first conversion efficiency 1/η1 corresponding to the first voltage Va1 and the second electric current Ia2 with the first conversion efficiency 1/η1 calculated in the step S2. The predicted value calculator 14 can update a value of the second conversion efficiency 1/η2 corresponding to the third voltage Vb1 and the fourth electric current Ib2 with the second conversion efficiency 1/η2 calculated in the step S2.

The first storage unit 50 may store the first voltage Va1, the second electric current Ia2, and a progressive average value of the first conversion efficiency 1/η1 thereof correspondingly. FIG. 4 is an illustration showing an example of data stored in the first storage unit 50. The predicted value calculator 14 can update the progressive average value of the first conversion efficiency 1/η1 corresponding to the first voltage Va1 and the second electric current Ia2 which were received in the step S1, by using the first conversion efficiency 1/η1 calculated in the step S2. In this case, the predicted value calculator 14 calculates a newest progressive average value of the first conversion efficiency 1/η1 corresponding to the first voltage Va1 and the second electric current Ia2 which were received in the step S1 by using a following equation Eq. 3, and updates the progressive average value of the first conversion efficiency 1/η1 in the first storage unit 50 with the newest progressive average value of the first conversion efficiency 1/η1.

A newest progressive average value of the 1/η1={(a preceding progressive average value of the 1/η1) *number of samples+a newest 1/η1}/(the number of samples+1)  (Eq. 3)

The second storage unit 60 may store the third voltage Vb1, the fourth electric current Ib2, and a progressive average value of the second conversion efficiency 1/η2 thereof correspondingly. FIG. 5 is an illustration showing an example of data stored in the second storage unit 60. The predicted value calculator 14 can update the progressive average value of the second conversion efficiency 1/η2 corresponding to the third voltage Vb1 and the fourth electric current Ib2 which were received in the step S1, by using the second conversion efficiency 1/η2 calculated in the step S2. In this case, the predicted value calculator 14 calculates a newest progressive average value of the second conversion efficiency 1/η2 corresponding to the third voltage Vb1 and the fourth electric current Ib2 which were received in the step S1 by using a following equation Eq. 4, and updates the progressive average value in the second storage unit 60 by the newest progressive average value of the second conversion efficiency 1/η2.

A newest progressive average value of the 1/η2={(a preceding progressive average value of the 1/η2) *number of samples+a newest 1/η2}/(the number of samples+1)  (Eq. 4)

As shown in FIG. 3, after step S3, the predicted value calculator 14 then determines if a total output electric current is smaller than a rated current of each of the first converter 16 and the second converter 23 (in step S4). The total output electric current is the total of the second electric current and the fourth electric current which were received in the step S1, that is, the total of the electric current of the secondary side of the first converter 16 and the electric current of the secondary side of the second converter 23. When the total output electric current is larger than the rated current of each of the converters (step S4: No), the predicted calculator 14 outputs a signal which indicates that the total output electric current is larger than the rated value to the controller 15. When the controller 15 receives that signal, the controller 15 switches the electric power condition to the third power source condition (in step S5). Specifically, the controller 15 controls the first switch SW1 into on-state, the second switch SW2 into on-state, and the third switch SW3 into off-state.

When the total output electric current is smaller than the rated current of each of the converters (step S4: Yes), the predicted calculator 14 calculates the first predicted value Pa, the second predicted value Pb, and the third predicted value Pab (in step S6). For example, when the current electric power source condition is the third power source condition (the first converter 16 and the second converter 23 are used), the predicted value calculator 14 reads the newest first conversion efficiency 1/η1 corresponding to the first voltage Va1 and the second electric current Ia2 which were received in the step S1 from the first storage unit 50 which was updated in the step S3, and reads the newest second conversion efficiency 1/η2 corresponding to the third voltage Vb1 and the fourth electric current Ib2 which were received in the step S1 from the second storage unit 60 which was updated in the step S3. Then, the predicted value calculator 14 calculates the first predicted value Pa, the second predicted value Pb, and the third predicted value Pab by the read first conversion efficiency 1/η1, the read second conversion efficiency 1/η2, the second electric current Ia2 which was received in the step S1, the second voltage Va2 which was received in the step S1, the fourth electric current Ib2 which was received in the step S1, and the fourth voltage Va2 which was received in the step S1. The predicted value calculator 14 calculates the first predicted value Pa by a following equation Eq. 5, calculates the second predicted value Pb by a following equation Eq. 6, and calculates the third predicted value Pab by a following equation Eq. 7.

$$Pa = 1/\eta1 * \{(Ia2+Ib2)*Va2\} \quad \text{Eq. 5}$$

$$Pb = 1/\eta2 * \{(Ia2+Ib2)*Vb2\} \quad \text{Eq. 6}$$

$$Pab = 1/\eta1*(Ia2*Va2)+1/\eta2*(Ib2*Vb2) \quad \text{(Eq. 7)}$$

For example, when the current electric power source condition is the first power source condition (only the converter 16 is used) or is the second power source condition (only the converter 23 is used), the method of calculating the first predicted value Pa and the second predicted value Pb is similar to above, and the method of calculating of the third predicted value Pab is different from above. In the following description, the method of calculating the third predicted value Pab in this case is described.

In this case, the storage unit 30 stores a table of ratios of current sources, which indicates the ratio of the second electric current Ia2 and the fourth electric current Ib2 in the total output electric current at each mode of the image forming system 100, as shown in FIG. 6. The predicted value calculator 14 reads the ratio of the second electric current Ia2 and the ratio of the fourth electric current Ib2 corresponding to the current mode of the image forming system 100, and calculates new second electric current Ia2 and new fourth electric current Ib2 by the read ratio of the second electric current Ia2, the ratio of the fourth electric current Ib2, the second electric current Ia2 which was received in the step S1, and the fourth electric current Ib2 which was received in the step S1. The predicted value calculator 14 can then calculate the new second electric current by a following equation Eq. 8, and can calculate the new fourth electric current by a following equation Eq. 9. In the following equations Eq. 8 and Eq. 9, the ratio of the second electric current Ia2 is written as $\gamma 2$, the ratio of the fourth electric current Ib2 is written as $\gamma 4$, the new second electric current Ia2 is written as New Ia2, and the new fourth electric current Ib2 is written as New Ib2.

$$\text{New } Ia2 = (Ia2 + Ib2) * \gamma 2 \quad \text{(Eq. 8)}$$

$$\text{New } Ib2 = (Ia2 + Ib2) * \gamma 4 \quad \text{(Eq. 9)}$$

The predicted value calculator 14 reads the first conversion efficiency $1/\eta 1$ corresponding to the new second electric current Ia2 and the first voltage Va1 which was received in the step S1 from the first storage unit 50 which was updated in the step S3, and reads the second conversion efficiency $1/\eta 2$ corresponding to the new fourth electric current Ib2 and the third voltage Vb1 which was received in the step S1 from the second storage unit 60 which was updated in the step S3. The predicted value calculator 14 calculates the third predicted value Pab by a new read first conversion efficiency $1/\eta 1$, a new read second conversion efficiency $1/\eta 2$, a new calculated second electric value New Ia2, a new calculated second electric value New Ib2, the second voltage Vat which was received in the step S1, and the fourth voltage Vb2 which was received in the step S1. The predicted value calculator 14 calculates the third predicted value by a following equation Eq. 10. In the following equation Eq. 10, the new read first conversion efficiency $1/\eta 1$ is written as New $1/\eta 1$ and the new read second conversion efficiency $1/\eta 2$ is written as New $1/\eta 2$.

$$Pab = \text{New } 1/\eta 1 * (\text{New } Ia2 * Va2) + \text{New } 1/\eta 2 * (\text{New } Ib2 * Vb2) \quad \text{(Eq. 10)}$$

Then, in step S7, the controller 15 determines if the third predicted value Pab is smaller than the first predicted value Pa and is smaller than the second predicted value Pb. When the third predicted value Pab is smaller than the first predicted value Pa and is smaller than the second predicted value Pb (Step S7: Yes), the controller 15 then switches the electric power condition to the third power source condition corresponding to the third predicted value Pab (in step S8). Specifically, the controller 15 controls the first switch SW1 into on-state, the second switch SW2 into on-state, and the third switch SW3 into off-state.

When the third predicted value Pab is larger than the first predicted value Pa or the second predicted value Pb (step S7: No), the controller 15 then determines if the first predicted value Pa is smaller than the second predicted value Pb (in step S9).

In the step S9, when the first predicted value Pa is smaller than the second predicted value Pb (step S9: Yes), the controller 15 then switches the electric power condition to the first power source condition corresponding to the first predicted value Pa (in step S10). Specifically, the controller 15 controls the first switch SW1 into on-state, the third switch SW3 into on-state, and the second switch SW2 into off-state.

In the step S9, when the first predicted value Pa is larger than the second predicted value Pb (step S9: No), the controller 15 then switches the electric power condition to the second power source condition corresponding to the second predicted value Pb (in step S11). Specifically, the controller 15 controls the second switch SW2 into on-state, the third switch SW3 into on-state, and the first switch SW1 into off-state.

Next, a concrete example is described. For example at start, the electric power source condition is the third power source condition. For example in the step S1, the controller 15 receives values so that the first electric current Ia1 is 2.0 A, the first voltage Va1 is 100V, the second electric current Ia2 is 1.5 A, the second voltage Va2 is 99V, the third electric current Ib1 is 2.5 A, the third voltage Vb1 is 100.5V, the fourth electric current Ib2 is 2.0 A, and the fourth voltage Vb2 is 99.5V.

The predicted value calculator 14 calculates the first conversion efficiency $1/\eta 1$ by substituting the first electric current Ia1, the first voltage Va1, the second electric current Ia2, and the second voltage Va2 which were received in the step S1 into the Eq. 1. The predicted value calculator 14 calculates the second conversion efficiency $1/\eta 2$ by substituting the third electric current Ib1, the third voltage Vb1, the fourth electric current Ib2, and the fourth voltage Vb2 which were received in the step S1 into the Eq. 2 (in step S2). In this example, the first conversion efficiency $1/\eta 1$ is 1.35, the second conversion efficiency $1/\eta 2$ is 1.26.

The predicted value calculator 14 then updates the data stored in the first storage unit 50 with the first conversion efficiency $1/\eta 1$ which was calculated in the step S2, and updates the data stored in the second storage unit 60 with the second conversion efficiency $1/\eta 2$ which was calculated in the step S2 (in step S3). In this example, the first conversion efficiency $1/\eta 1$ corresponding to the first voltage Va1 (=100V) and the second electric current Ia2 (=1.5 V) is updated with 1.35, and the second conversion efficiency $1/\eta 2$ corresponding to the third voltage Vb1 (=100.5V) and the fourth electric current Ib2 (=2.0 A) is updated with 1.26.

The predicted value calculator 14 then determines that the total output electric current, which is the total of the second electric current Ia2 and the fourth electric current Ib2 (=1.5 A+2.0 A), is smaller than the rated current of each of the converters (=5 A) (step S4: Yes). The predicted value calculator 14 calculates the first predicted value P1, the second predicted value Pb, and the third predicted value Pab (in step S6). In this example, the first predicted value Pa is $1/\eta 1*\{(Ia2+Ib2)*Va2\}=1.35*\{(1.5A+2.0A)*99V\}=467.78$ W. The second predicted value Pb is $1/\eta 2*\{(Ia2+Ib2)*Vb2\}=1.26*\{(1.5A+2.0A)*99.5V\}=438.80$ W. The third predicted value Pab is $1/\eta 1*(Ia2*Va2)+1/\eta 2*(Ib2*Vb2)=1.35*(1.5 A*99V)+1.26*(2.0 A*99.5V)=451.22$ W.

The third predicted value Pab (=451.22 W) is larger than the second predicted value Pb (=438.80 W) (step S7: NO), and thereby then the controller 15 performs the step S9. The first predicted value Pa (=467.78 W) is larger than the second predicted value Pb (step S9: NO), thereby the controller 15 then performs the step S11. In the step S11, the controller 15 switches the switching unit 30 to the second electric condition. That is, the image forming system 100 uses only the second converter 23 in this example.

In this embodiment, the predicted value calculator 14 calculates a first predicted value Pa which is a predicted value of the needed electric power in the first power source condition, a second predicted value Pb which is a predicted value of the needed electric power in the second power source condition, and a third predicted value Pab which is a predicted value of the needed electric power in the third power source condition, based on the first conversion efficiency $1/\eta1$ which is conversion efficiency of the first converter 16 and the second first conversion efficiency $1/\eta2$ which is conversion efficiency of the second converter 23. The controller 15 switches the switching unit 30 to the electric power condition corresponding to the smallest predicted value of the first predicted value Pa, the second predicted value Pb, and the third predicted value Pab. This enables the image forming system 100 to operate with high electric efficiency.

Additionally, the supplied power may be AC power or DC power. The commercial power supply 112 and the commercial power supply 110 may be a same system or a different system, and can be any system.

Figure 7A:
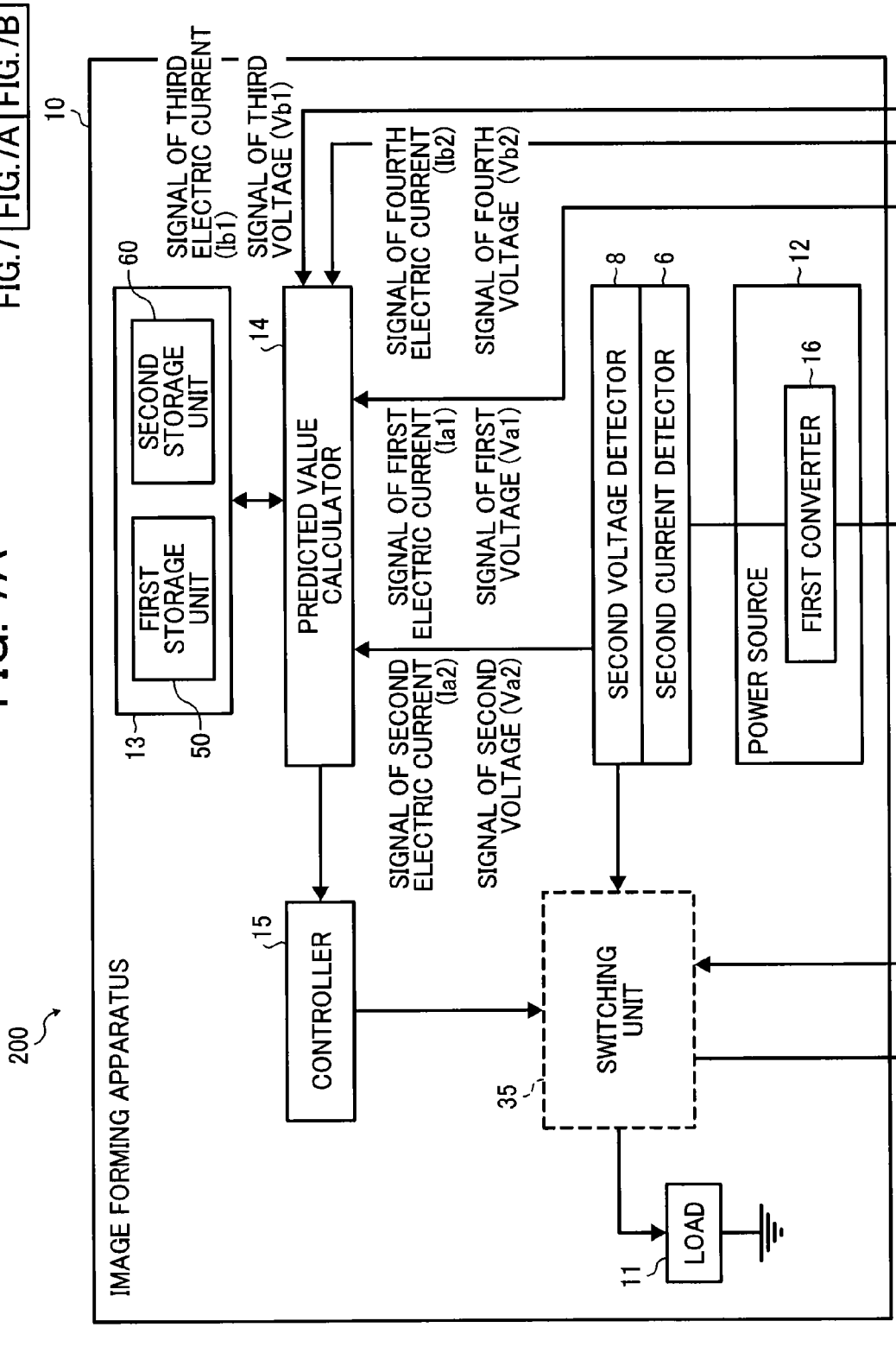

Next, a description will be given of a second embodiment of the present invention. In the second embodiment, the same constituent parts as in the first embodiment are referred to by the same numerals so that detailed description of those parts will be omitted. As shown in FIGS. 7A, 7B, the switching unit 35 of the image forming system 200 of the second embodiment can join the first direct current power output from the first converter 16 and the second direct current power output from the second converter 23, and can supply the joined power to the load 11 of the image forming apparatus 10 or the load 21 of the peripheral apparatus 20. In the second embodiment, the switching unit 35 can switch the electric power source condition to a first power source condition, a second power source condition, and a third power source condition.

In the first power source condition of the second embodiment, the first direct current power is supplied to the load 11 of the image forming apparatus 10 and the load 21 of the peripheral apparatus 20, and the second direct current power is not supplied to the load 11 of the image forming apparatus 10 and the load 21 of the peripheral apparatus 20. In the second power source condition, the second direct current power is supplied to the load 11 of the image forming apparatus 10 and the load 21 of the peripheral apparatus 20, and the first direct current power is not supplied to the load 11 of the image forming apparatus 10 and the load 21 of the peripheral apparatus 20. In the third power source condition, the joined power of the first direct current power and the second direct current power is supplied to the load 11 of the image forming apparatus 10 and the load 21 of the peripheral apparatus 20.

Figure 8:
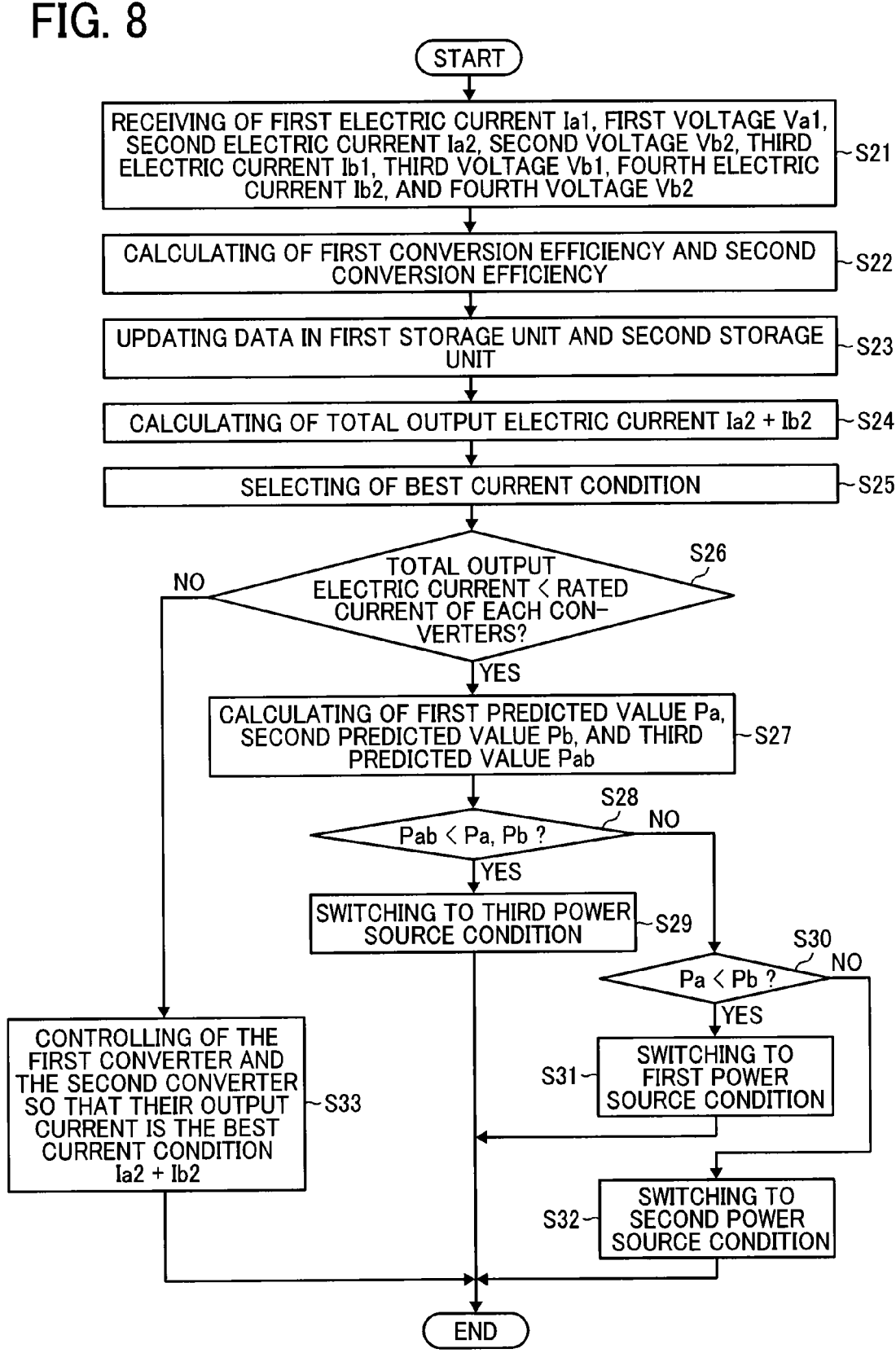
FIG. 8 is a flowchart showing an exemplary operation by the image forming system according to the second embodiment of the present invention.

In this embodiment, when joining the first direct current power output from the first converter 16 and the second current power output from the second converter 23, the predicted value calculator 14 selects the best current condition based on the electrical current of the secondary side of each of the converters 16, 23. An exemplary operation of the image forming system 200 according to the second embodiment of the invention is discussed in detail in the flowchart of FIG. 8. FIG. 8 is a flowchart showing an exemplary operation by the image forming system 200. For the same constituent parts as in the first embodiment, description of the parts will be omitted.

Processes in step S21 to step S23 of FIG. 8 are similar to processes in step S1 to step S3 of FIG. 3. In step S24, the predicted value calculator 14 calculates the total output electric current, which is a total of the second electrical current Ia2 and the fourth electrical current Ib2 which were received in step S21. The predicted value calculator 14 selects the best electric current condition by the total output electric current, data stored in the first storage unit 50, and data stored in the second storage unit 60, when joining the first direct current power and the second direct current power (in step S25).

Specifically, the predicted value calculator 14 selects a combination of the second electric current Ia2 and the fourth electric current Ib2 so that the total output electric current is the same as the total of the second electric current Ia2 (requirement 1) and the fourth electric current Ib2, and so that the third predicted value Pab is smallest (requirement 2). As a concrete example in the step S21, the controller 15 can receive values so that the first electric current Ia1 is 2.0 A, the first voltage Va1 is 100V, the second electric current Ia2 is 1.5 A, the second voltage Va2 is 99V, the third electric current Ib1 is 2.5 A, the third voltage Vb1 is 100.5V, the fourth electric current Ib2 is 2.0 A, and the fourth voltage Vb2 is 99.5V. In this case, the output electric current calculated in the step S24 is Ia2+Ib2=3.5 A.

With reference to FIG. 9, the predicted value calculator 14 then (in step S25) searches combinations for which Ia2+Ib2=3.5 A with reference to data stored in the first storage unit 50 and the second storage unit 60. The predicted value calculator 14 reads the first conversion efficiency $1/\eta1$ corresponding to the second electric current Ia2 of each combination and the first voltage Va1 (=100V) which was received in step S21 in each combination from data in the first storage unit 50. The predicted value calculator 14 reads the second conversion efficiency $1/\eta2$ corresponding to the fourth electric current Ia4 of each combination and the third voltage Vb1 (=100.5V) which was received in step S21 in each combination from data in the second storage unit 60. In each combination, the predicted value calculator 14 substitutes the first conversion efficiency $1/\eta1$, the second electric current Ia2, the second voltage Va2, the second conversion efficiency $1/\eta2$, the fourth electric current Ib2, and the fourth voltage Vb2 corresponding for each combination into Eq. 7, and calculates the third predicted value Pab corresponding to each combination. Then, the predicted value calculator 14 selects a combination as the best electric current condition so that the third predicted value Pab is smallest (in step S25).

Content of step S26 is similar to the step S4, and a detailed description is omitted. In the step S26, if the total output electrical current is smaller than the rated current of each converter (step S26: YES), the predicted value calculator 14 performs step S27. Processes in step S27 to step S32 are similar to processes in step S6 to step S11 in FIG. 3, and detailed description is omitted.

In the step S26, if the total output electrical current is larger than the rated current of each converter (step S26: NO), the predicted value calculator 14 performs step S33. In the step S33, the controller 15 controls operation of the first converter 16 and operation of the second converter 23 so that both converters 16, 23 output the second electric current Ia2 and the fourth electric current Ib2 which were selected in the step S25.

The present invention is not limited to the embodiments described above and various changes may be made without departing from the scope of the invention.

Next, a description will be given of a first modification example of the present invention. For example the image forming system 100 (200) may not include the first storage unit 50 and the second storage unit 60, and in that case the predicted value calculator 14 may calculate the first predicted value Pa, the second predicted value Pb, and the third predicted value Pab by the first conversion efficiency 1/η1 and the second conversion efficiency 1/η2 which were calculated in the step S2 (FIG. 3) or the step S22 (FIG. 8). In this case, the process of the step S3 (in FIG. 3) and the process of the step S23 (in FIG. 8) are not needed. In this configuration, the calculation precision of the first predicted value Pa and the second predicted value Pb and the third predicted value Pab may worsen, but the configuration of the image forming system 100 (200) can be simpler because the first storage unit 50 and the second voltage unit 60 are not needed.

Next, a description will be given of a second modification example of the present invention. For example the image forming system 100 (200) may not include the peripheral apparatus 20, and then the image forming system 100 (200) may only include the image forming apparatus 10 that includes two power sources, that is, which is supplied power from two commercial power supplies. Specifically, the image forming system 100 (200) may not include the peripheral apparatus 20, and the image forming apparatus 10 may include both the power source 12 and the power source 22. In the first power source condition of this configuration, the load 11 of the image forming apparatus 10 is supplied the first direct current power and the load 11 of the image forming apparatus 10 is not supplied the second direct current power. In the second power source condition of this configuration, the load 11 of the image forming apparatus 10 is supplied the second direct current power and the load 11 of the image forming apparatus 10 is not supplied the first direct current power. In the third power source condition of this configuration, the load 11 of the image forming apparatus 10 is supplied the first direct current power and the second direct current power.

This invention can also apply to an electronic apparatus that includes the first converter 16, the second converter 23, the predicted value calculator 14, and the controller 15. The first converter 16 can convert the supplied power which is supplied externally to the first direct current power. The second converter 23 can convert the supplied power which is supplied externally to the second direct current power. The predicted value calculator 14 can calculate a first predicted value, which is a predicted value of the needed electric power in the first power source condition, a second predicted value, which is a predicted value of the needed electric power in the second power source condition, and a third predicted value, which is a predicted value of the needed electric power in the third power source condition, based on the first conversion efficiency and the second first conversion efficiency. The controller 15 can switch the electric power condition corresponding to the smallest predicted value of the first predicted value, the second predicted value, and the third predicted value.

Figure 10:
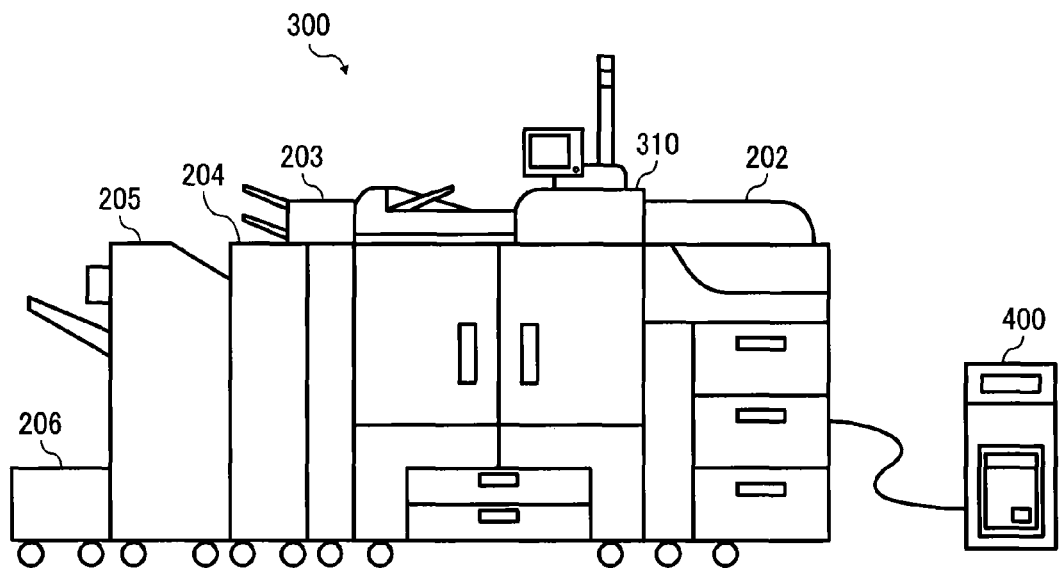
FIG. 10 is a schematic configuration view showing an example of an image forming system according to a modification example of the present invention; and, FIG. 11 is a hardware configuration view showing an example of an image forming system according to a modification example of the present invention.

Next, a description will be given of a further modification example of the present invention. For example, the storage unit 13, the predicted value calculator 14, and the controller 15 may be included in an external controller (for example, external server, DFE: digital front end). FIG. 10 is a schematic configuration view showing an example of the image forming system 300 of this example. The image forming system 300 is a production printing system, and the image forming system 300 includes the external controller 400 (DFE 400). The image forming system 300 includes the image forming apparatus 310, and can include a high capacity sheet feeder 202, an inserter 203 which inserts a cover sheet, a folder 204 which folds a sheet, a finisher 205 which staples and punches, and a cutter 206, according to a necessity of use.

Figure 11:
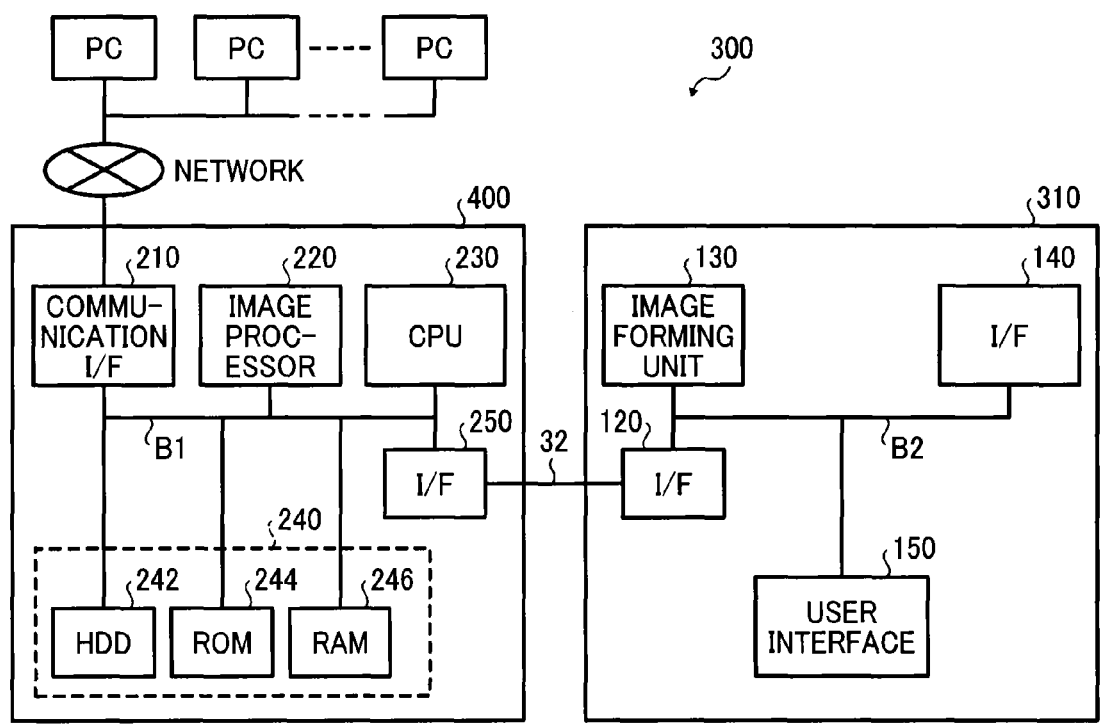

FIG. 11 is a hardware configuration view showing an example of the image forming system 300. As shown in FIG. 11, the DFE 400 includes a communication interface 210, an image processor 220, a CPU 230, a storage unit 240 which includes a HDD 242, a ROM 244, a RAM 246, and an interface 250, which are connected to each other via a bus B1. The communication interface can communicate with the host apparatus such as a PC via a network such as internet. For example, the communication interface 210 can receive image data which is sent from the host apparatus.

The image processor 220 interprets the image data received from the host apparatus via the communication interface 210, and converts a form of the image data to be printed by the image forming apparatus. The image processor 220 applies processes (gamma correction or the like) to the converted image data. The CPU 230 controls the image forming system 300 with programs stored in the ROM 244 or the RAM 24, and executes the programs.

The interface 250 is connected to an exclusive line 32. The interface 250 is connected to the image forming apparatus 310 via the exclusive line 32. In the example of FIG. 11, the DFE 400 is connected to the image forming apparatus 310 via the exclusive line 32, although the DFE 400 may connect to the image forming apparatus 310 via the network.

As shown in FIG. 11, the image forming apparatus 310 includes an interface 120, an image forming unit 130, an interface 140, and a user interface 150, and they are connected via a bus B2. The interface 120 is connected to the exclusive line 32. The interface 120 is connected to the DFE 400 via the exclusive line 32. The image forming unit 130 forms images onto sheets. The image forming unit 130 performs a printing job based on being controlled by the CPU 230 of the DFE 400. The interface 140 can be connected to an external apparatus. The user interface 150 indicates a condition or state of the image forming apparatus 310, and receives an operation by a user.

In this example, the storage unit 13 is included in the storage unit 240 of the DFE 400, and the CPU 230 of the DFE 400 performs the function of the predicted calculator 14 and the function of the controller 15 by performing programs stored in the storage unit 240.

Additionally, for example, a part of the storage units 50, 60, the predicted value calculator 14, and the controller 15 may be included in the DFE 400, and other parts may be included in the image forming apparatus 310. For example, each function of the storage unit 13, the predicted value calculator 14, and controller 15 may be distributed into the DFE 400 and an other external apparatus.

Each embodiment and each example can be arbitrarily combined.

Additionally, the storage unit 13, the predicted value calculator 14, and the controller 15 can be configured by a usual computer which includes a CPU, a ROM, and a RAM. The CPU executes programs stored in the ROM utilizing the RAM. This enables to perform functions of the predicted calculator 14 and functions of the controller 15. The programs executed by the CPU of the computer can be provided in an installable format or an executable format recorded on a computer readable recording medium such as a compact disc read only memory (CD-ROM), a flexible disk (FD), a CD recordable (CD-R), or a digital versatile disk (DVD).

The programs can be stored on a computer connected to the network such as the Internet, and provided by downloading the programs via the network.

Furthermore, the programs can be provided or distributed via the network such as the Internet.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

What is claimed is:

1. A system comprising:
a first apparatus and a second apparatus which supply electric power to each other; and
the first apparatus comprising a first converter configured to convert externally supplied power to a first direct current power;
the second apparatus comprising a second converter configured to convert externally supplied power to a second direct current power;
the system further comprising:
a predicted value calculator configured to calculate, based on a first conversion efficiency of the first converter and a second conversion efficiency of the second converter, (a) a first predicted value of needed electric power in a first power source condition, which is a condition that the first direct current power is supplied to a load of the first apparatus and a load of the second apparatus and the second direct current power is not supplied to the load of the first apparatus and the load of the second apparatus, (b) a second predicted value of needed electric power in a second power source condition, which is a condition that the second direct current power is supplied to the load of the first apparatus and the load of the second apparatus and the first direct current power is not supplied to the load of the first apparatus and the load of the second apparatus, and (c) a third predicted value of needed electric power in a third power source condition, which is a condition that the first direct current power and the second direct current power are supplied to the load of the first apparatus and the load of the second apparatus; and
a controller configured to switch an electric power condition corresponding to a smallest predicted value of the first predicted value, the second predicted value, and the third predicted value.

2. The system of claim 1,
the first apparatus further comprising:
a first current detector configured to detect a first electric current of an input side of the first converter,
a second current detector configured to detect a second electric current of an output side of the first converter,
a first voltage detector configured to detect a first voltage of the input side of the first converter,
a second voltage detector configured to detect a second voltage of the output side of the first converter;
the second apparatus further comprising:
a third current detector configured to detect a third electric current of an input side of the second converter,
a fourth current detector configured to detect a fourth electric current of an output side of the second converter,
a third voltage detector configured to detect a third voltage of the input side of the second converter,
a fourth voltage detector configured to detect a fourth voltage of the output side of the second converter;
the predicted value calculator further configured to:
determine the first conversion efficiency based on the first electric current detected by the first current detector, the second electric current detected by the second current detector, the first voltage detected by the first voltage detector, and the second voltage detected by the second voltage detector,
determine the second conversion efficiency based on the third electric current detected by the third current detector, the fourth electric current detected by the fourth current detector, the third voltage detected by the third voltage detector, and the fourth voltage detected by the fourth voltage detector,
calculate the first predicted value, the second predicted value, and the third predicted value based on the first conversion efficiency, the second conversion efficiency, the first electric current, the first voltage, the second electric current, the second voltage, the third electric current, the third voltage, the fourth electric current, and the fourth voltage.

3. The system of claim 2, further comprising:
a first storage unit configured to store the first voltage, the second electric current, and the first conversion efficiency thereof correspondingly;
a second storage unit configured to store the third voltage, the fourth electric current, and the second conversion efficiency thereof correspondingly;
the predicted value calculator further configured to:
update data stored in the first storage unit with the first conversion efficiency calculated based on the first electric current detected by the first current detector, the second electric current detected by the second current detector, the first voltage detected by the first voltage detector, and the second voltage detected by the second voltage detector,
update data stored in the second storage unit with the second conversion efficiency calculated based on the third electric current detected by the third current detector, the fourth electric current detected by the fourth current detector, the third voltage detected by the third voltage detector, and the fourth voltage detected by the fourth voltage detector.

4. The system of claim 3,
the predicted value calculator further configured to:
read the first conversion efficiency corresponding to the first voltage detected by the first voltage detector and the second electric current detected the second current detector from the first storage unit which was updated,
read the second conversion efficiency corresponding to the third voltage detected by the third voltage detector and the fourth electric current detected by the fourth current detector from the second storage unit which was updated,
calculate the first predicted value, the second predicted value, and the third predicted value based on the read first conversion efficiency and the read second conversion efficiency.

5. The system of claim 2,
the predicted value calculator further configured to:
calculate the first conversion efficiency based on the first electric current detected by the first current detector, the second electric current detected by the second current detector, the first voltage detected by the first voltage detector, and the second voltage detected by the second voltage detector,
calculate the second conversion efficiency based on the third electric current detected by the third current detector, the fourth electric current detected by the fourth current detector, the third voltage detected by the third voltage detector, and the fourth voltage detected by the fourth voltage detector, calculate the first predicted value, the second predicted value, and the third predicted value based on the calculated first conversion efficiency and the calculated second conversion efficiency.

6. The system of claim 1, further comprising:
a switching unit configured to switch the electric power condition to the first power source condition, the second power source condition, and the third power source condition,
the controller further configured to control the switching unit to switch to the electric power condition corresponding to the smallest predicted value of the first predicted value, the second predicted value, and the third predicted value calculated by the predicted value calculator.

7. An electronic device that supplies electric power to a peripheral apparatus and receives electric power from the peripheral apparatus, the peripheral apparatus including a second converter configured to convert externally supplied power to a second direct current power, the device comprising:
a first converter configured to convert externally supplied power to a first direct current power;
a predicted value calculator configured to calculate, based on a first conversion efficiency of the first converter and a second conversion efficiency of the second converter, (a) a first predicted value of needed electric power in a first power source condition, which is a condition that the first direct current power is supplied to a load of the electronic device and a load of the peripheral apparatus and the second direct current power is not supplied to the load of the electronic device and the load of the peripheral apparatus, (b) a second predicted value of needed electric power in a second power source condition, which is a condition that the second direct current power is supplied to the load of the electronic device and the load of the peripheral apparatus and the first direct current power is not supplied to the load of the electronic device and the load of the peripheral apparatus, and (c) a third predicted value of needed electric power in a third power source condition, which is a condition that the first direct current power and the second direct current power are supplied to the load of the electronic device and the load of the peripheral apparatus; and
a controller configured to switch an electric power condition corresponding to a smallest predicted value of the first predicted value, the second predicted value, and the third predicted value.

8. The device of claim 7, wherein the peripheral apparatus further includes a third current detector configured to detect a third electric current of an input side of the second converter, a fourth current detector configured to detect a fourth electric current of an output side of the second converter, a third voltage detector configured to detect a third voltage of the input side of the second converter, a fourth voltage detector configured to detect a fourth voltage of the output side of the second converter;
the device further comprising:
a first current detector configured to detect a first electric current of an input side of the first converter;
a second current detector configured to detect a second electric current of an output side of the first converter;
a first voltage detector configured to detect a first voltage of the input side of the first converter;
a second voltage detector configured to detect a second voltage of the output side of the first converter;
the predicted value calculator further configured to:

determine the first conversion efficiency based on the first electric current detected by the first current detector, the second electric current detected by the second current detector, the first voltage detected by the first voltage detector, and the second voltage detected by the second voltage detector,
determine the second conversion efficiency based on the third electric current detected by the third current detector, the fourth electric current detected by the fourth current detector, the third voltage detected by the third voltage detector, and the fourth voltage detected by the fourth voltage detector,
calculate the first predicted value, the second predicted value, and the third predicted value based on the first conversion efficiency, the second conversion efficiency, the first electric current, the first voltage, the second electric current, the second voltage, the third electric current, the third voltage, the fourth electric current, and the fourth voltage.

9. The device of claim 8, further comprising:
a first storage unit configured to store the first voltage, the second electric current, and the first conversion efficiency thereof correspondingly;
a second storage unit configured to store the third voltage, the fourth electric current, and the second conversion efficiency thereof correspondingly;
the predicted value calculator further configured to:
update data stored in the first storage unit with the first conversion efficiency calculated based on the first electric current detected by the first current detector, the second electric current detected by the second current detector, the first voltage detected by the first voltage detector, and the second voltage detected by the second voltage detector,
update data stored in the second storage unit with the second conversion efficiency calculated based on the third electric current detected by the third current detector, the fourth electric current detected by the fourth current detector, the third voltage detected by the third voltage detector, and the fourth voltage detected by the fourth voltage detector.

10. The device of claim 9,
the predicted value calculator further configured to:
read the first conversion efficiency corresponding to the first voltage detected by the first voltage detector and the second electric current detected the second current detector from the first storage unit which was updated,
read the second conversion efficiency corresponding to the third voltage detected by the third voltage detector and the fourth electric current detected by the fourth current detector from the second storage unit which was updated,
calculate the first predicted value, the second predicted value, and the third predicted value based on the read first conversion efficiency and the read second conversion efficiency.

11. The device of claim 9,
the predicted value calculator further configured to:
calculate the first conversion efficiency based on the first electric current detected by the first current detector, the second electric current detected by the second current detector, the first voltage detected by the first voltage detector, and the second voltage detected by the second voltage detector,
calculate the second conversion efficiency based on the third electric current detected by the third current detector, the fourth electric current detected by the fourth current detector, the third voltage detected by the third voltage detector, and the fourth voltage detected by the fourth voltage detector, calculate the first predicted value, the second predicted value, and the third predicted value based on the calculated first conversion efficiency and the calculated second conversion efficiency.

12. The device of claim 7, further comprising:
a switching unit configured to switch the electric power condition to the first power source condition, the second power source condition, and the third power source condition,
the controller further configured to control the switching unit to switch to the electric power condition corresponding to the smallest predicted value of the first predicted value, the second predicted value, and the third predicted value calculated by the predicted value calculator.

13. An electronic device comprising:
a first converter of a first apparatus configured to convert externally supplied power to a first direct current power;
a second converter of a second apparatus configured to convert externally supplied power to a second direct current power;
a predicted value calculator configured to calculate, based on a first conversion efficiency of the first converter and a second conversion efficiency of the second converter, (a) a first predicted value of needed electric power in a first power source condition, which is a condition that the first direct current power is supplied to a load of the first apparatus and a load of the second apparatus and the second direct current power is not supplied to the load of the first apparatus and the load of the second apparatus, (b) a second predicted value of needed electric power in a second power source condition, which is a condition that the second direct current power is supplied to the load of the first apparatus and the load of the second apparatus and the first direct current power is not supplied to the load of the first apparatus and the load of the second apparatus, and (c) a third predicted value of needed electric power in a third power source condition, which is a condition that the first direct current power and the second direct current power are supplied to the load of the first apparatus and the load of the second apparatus; and
a controller configured to switch an electric power condition corresponding to a smallest predicted value of the first predicted value, the second predicted value, and the third predicted value.

14. The device of claim 13, further comprising:
a first current detector configured to detect a first electric current of an input side of the first converter;
a second current detector configured to detect a second electric current of an output side of the first converter;
a first voltage detector configured to detect a first voltage of the input side of the first converter;
a second voltage detector configured to detect a second voltage of the output side of the first converter;
a third current detector configured to detect a third electric current of an input side of the second converter;
a fourth current detector configured to detect a fourth electric current of an output side of the second converter;
a third voltage detector configured to detect a third voltage of the input side of the second converter;
a fourth voltage detector configured to detect a fourth voltage of the output side of the second converter;
the predicted value calculator further configured to:

determine the first conversion efficiency based on the first electric current detected by the first current detector, the second electric current detected by the second current detector, the first voltage detected by the first voltage detector, and the second voltage detected by the second voltage detector, determine the second conversion efficiency based on the third electric current detected by the third current detector, the fourth electric current detected by the fourth current detector, the third voltage detected by the third voltage detector, and the fourth voltage detected by the fourth voltage detector, calculate the first predicted value, the second predicted value, and the third predicted value based on the first conversion efficiency, the second conversion efficiency, the first electric current, the first voltage, the second electric current, the second voltage, the third electric current, the third voltage, the fourth electric current, and the fourth voltage.

15. The device of claim 14, further comprising:
a first storage unit configured to store the first voltage, the second electric current, and the first conversion efficiency thereof correspondingly;
a second storage unit configured to store the third voltage, the fourth electric current, and the second conversion efficiency thereof correspondingly;
the predicted value calculator further configured to:
update data stored in the first storage unit with the first conversion efficiency calculated based on the first electric current detected by the first current detector, the second electric current detected by the second current detector, the first voltage detected by the first voltage detector, and the second voltage detected by the second voltage detector,
update data stored in the second storage unit with the second conversion efficiency calculated based on the third electric current detected by the third current detector, the fourth electric current detected by the fourth current detector, the third voltage detected by the third voltage detector, and the fourth voltage detected by the fourth voltage detector.

16. The device of claim 15,
the predicted value calculator further configured to:
read the first conversion efficiency corresponding to the first voltage detected by the first voltage detector and the second electric current detected the second current detector from the first storage unit which was updated,
read the second conversion efficiency corresponding to the third voltage detected by the third voltage detector and the fourth electric current detected by the fourth current detector from the second storage unit which was updated,
calculate the first predicted value, the second predicted value, and the third predicted value based on the read first conversion efficiency and the read second conversion efficiency.

17. The device of claim 14,
the predicted value calculator further configured to:
calculate the first conversion efficiency based on the first electric current detected by the first current detector, the second electric current detected by the second current detector, the first voltage detected by the first voltage detector, and the second voltage detected by the second voltage detector,
calculate the second conversion efficiency based on the third electric current detected by the third current detector, the fourth electric current detected by the fourth current detector, the third voltage detected by the third voltage detector, and the fourth voltage detected by the fourth voltage detector, calculate the first predicted value, the second predicted value, and the third predicted value based on the calculated first conversion efficiency and the calculated second conversion efficiency.

18. The device of claim 13, further comprising:

a switching unit configured to switch the electric power condition to the first power source condition, the second power source condition, and the third power source condition, the controller further configured to control the switching unit to switch to the electric power condition corresponding to the smallest predicted value of the first predicted value, the second predicted value, and the third predicted value calculated by the predicted value calculator.

* * * * *